United States Patent
Bruss et al.

(10) Patent No.: US 9,361,290 B2
(45) Date of Patent: Jun. 7, 2016

(54) SYSTEM AND METHODOLOGY FOR ASSESSING AND PREDICTING LINGUISTIC AND NON-LINGUISTIC EVENTS AND FOR PROVIDING DECISION SUPPORT

(71) Applicants: Christopher Bayan Bruss, Washington, DC (US); Pouya Johnathon Ehsani, Washington, DC (US)

(72) Inventors: Christopher Bayan Bruss, Washington, DC (US); Pouya Johnathon Ehsani, Washington, DC (US)

(*) Notice: Subject to any disclaimer, the term of this patent is extended or adjusted under 35 U.S.C. 154(b) by 147 days.

(21) Appl. No.: 14/158,822

(22) Filed: Jan. 18, 2014

(65) Prior Publication Data

US 2015/0205787 A1    Jul. 23, 2015

(51) Int. Cl.
   *G06F 17/20* (2006.01)
   *G06F 17/27* (2006.01)

(52) U.S. Cl.
   CPC ........ *G06F 17/2735* (2013.01); *G06F 17/2785* (2013.01)

(58) Field of Classification Search
   None
   See application file for complete search history.

(56) References Cited

U.S. PATENT DOCUMENTS

| | | |
|---|---|---|
| 6,549,897 B1 | 4/2003 | Katariya et al. |
| 6,847,966 B1 | 1/2005 | Sommer et al. |
| 8,160,867 B1 | 4/2012 | Shaw |
| 8,249,886 B2 | 8/2012 | Meyer et al. |
| 8,340,956 B2 | 12/2012 | Matsukawa et al. |
| 8,510,300 B2 | 8/2013 | Lawrence et al. |
| 2006/0161543 A1* | 7/2006 | Feng ............... G06F 17/30684 |
| 2013/0144605 A1* | 6/2013 | Brager .............. G06F 17/3061 704/9 |
| 2013/0191391 A1* | 7/2013 | Pradhan ........... G06F 17/30699 707/737 |
| 2013/0218849 A1* | 8/2013 | Srinivasan ......... G06F 17/2735 707/692 |
| 2014/0278349 A1* | 9/2014 | Grieves ............. G06F 17/2735 704/8 |
| 2015/0205787 A1* | 7/2015 | Bruss ............... G06F 17/2735 704/8 |

\* cited by examiner

*Primary Examiner* — Marcus T Riley
(74) *Attorney, Agent, or Firm* — Symbus Law Group, LLC; Charles B. Lobsenz (57) ABSTRACT

According to one aspect of the present invention, a system and methodology is provided which provides valuable risk assessment and warnings as well as predictions of possible events which may occur in corporate, governmental, business or other types of organizational settings. In a personal context, the present invention may provide valuable data regarding predicted personal behavior, events, activities as well as data regarding affinity or lack thereof between and among individuals as well as a great many other characteristics of inter-personal relationships.

21 Claims, 4 Drawing Sheets

Term by Document Matrix

| Document # | TERM | | | | |
|---|---|---|---|---|---|
| | Diligent | Respectful | Active | Pursue | Employer |
| Doc 1 | 3 | 6 | 2 | 4 | 1 |
| Doc 2 | 4 | 1 | 3 | 9 | 0 |
| Doc 3 | 1 | 0 | 3 | 7 | 2 |
| Doc 4 | 3 | 4 | 6 | 1 | 2 |
| Doc 5 | 0 | 2 | 4 | 3 | 1 |
| . . . . | | | | | |

Fig. 3

SYSTEM AND METHODOLOGY FOR ASSESSING AND PREDICTING LINGUISTIC AND NON-LINGUISTIC EVENTS AND FOR PROVIDING DECISION SUPPORT

FIELD OF THE INVENTION

The present invention relates generally to the analysis of linguistic data and more particularly to a system and method that analyzes linguistic data and provides information with respect to that analysis upon which decisions can be made.

BACKGROUND OF THE INVENTION

Decisions in various contexts can have a profound impact on results achieved. In the case of businesses, decisions made by employees across all levels and functional roles can significantly affect ultimate success or failure. More specifically, decisions, whether strategic or tactical, can impact, for example, revenue growth, exposure to lawsuits, level of risk for loss or injury to persons or property, customer defections/acquisitions and product and service desirability.

In the case of personal matters, decisions made by individuals on a daily basis typically have a strong impact on the quality of their lives, the quality of their relationships and their ultimate happiness. Decisions in this context can be decisions made with respect to an individual's social interactions, decisions relating to an individual's work life and/or decisions related to other activities or relationships maintained by the individual.

Due to the prevalence of computers and other consumer electronic devices, a very significant amount of communication between and among individuals occurs electronically. This may include emails between friends or emails between employees in a corporate environment. Similarly, employees may receive and/or send emails from or to many third parties in connection with their job responsibilities. Other forms of communication are also frequently used in sharing information in both corporate and personal environments. For example, documents, PowerPoint presentations, spreadsheets, photos, videos, drawings and many other forms of data are used to communicate information from one or more persons to one or more other persons.

In the great majority of these communications, there exists at least some linguistic data. In other words, most of these communications, regardless of form, includes some data comprising written language. There has been a great deal of study to date with respect to how this written language may affect future events and/or decisions. The language contained in these communications may be analyzed at either a micro or macro level or anything in between. In other words, single communications, such as an email from one person to another may be studied and may be indicative of some mindset or some other characteristic that could possibly be a predictor of a future event, some risk that may be present or some other decision that should or could be made. At the other end of the spectrum, large groupings of communications can be aggregated and analyzed to generate the same kinds of predictions. For example, a set of corporate communications between employees to include the content of the email itself as well as attached documents and other materials, can be collectively analyzed over some time period to make various assessments about risks and provide decision making support.

While there exist a number of helpful tools and systems for analyzing such data, there also exist a number of drawbacks. In some cases, the analysis is less than ideal due to the way the analysis is conducted. For example, in some cases, linguistic data is processed to generate a dictionary of terms and equate some level of importance to each of these terms for use in the analysis. Often, terms are weighted with either too much or too little importance due to various factors, resulting in a skewed analysis which may not provide for ideal decision support. Similarly, current systems may be overbroad or too narrow in terms of the dataset used for the analysis. In other cases, even though the analysis may be acceptable, the application of the analysis to decision support and/or predictive functions is not ideal.

SUMMARY OF THE INVENTION

It is thus a primary object of the invention to provide a system and methodology that addresses the shortcomings of the prior art as discussed above.

It is another object of the present invention to provide a system and methodology which implements an assessment functionality comprising decision support based on an analysis of a wide variety of sources of linguistic data.

It is a further object of the present invention to provide a system and methodology which implements decision support using a linguistic dictionary or lexicon (collectively referred to herein as a "dictionary") which is created through one or more sources of written communication.

It is a still further object of the present invention to provide a system and methodology which offers decision support capabilities through the use of a linguistic dictionary which is dynamically updated over time.

It is a yet further object of the present invention to provide a system and methodology which offers decision support capabilities through the use of a linguistic dictionary which is updated based on linguistic data which is only available post-deployment.

It is an even further object of the present invention to provide a system and methodology which offers decision support capabilities in the context of personal communications and personal activities and/or events.

It is another object of the present invention to provide a system and methodology which offers decision support capabilities in the context of business/corporate communications and business related activities and/or events.

It is still another object of the present invention to provide a system and methodology which offers risk assessment capabilities in a personal context.

It is an even further object of the present invention to provide a system and methodology which offers risk assessment capabilities in a corporate, governmental or other non-personal context.

It is yet another object of the present invention to provide a system and methodology which employs one or more models to predict linguistic outcomes.

It is a still further object of the present invention to provide a system and methodology which employs one or more models to predict non-linguistic outcomes.

According to one aspect of the present invention, a system and methodology is provided which creates a dictionary based on linguistic data received in various forms. Once this dictionary is created, one or more datasets are provided to the system and based on an analysis of these datasets as against the applicable dictionary using one or more predetermined models, assessment and/or predictive information is generated. The assessment information may be generated for individuals and organizations for the purpose of generating a baseline profile against which future changes can be compared.

The predictive information can take one or more of many different forms. For example, the predictive information may comprise an assessment of current culture in an organization and possible future events or situations could arise based upon the adaptation of that culture. Similarly, and as yet another example, the predictive information may comprise risk information associated with a possible future event such as a safety breach. In still another example, the system may generate predictive information which applies in a personal context such as predictive information about potential future behavior, activities, actions or events associated with one or more persons based upon one or more datasets containing linguistic data generated by those one or more persons.

The system and methodology of the present invention has a great many applications in both a personal context and in an organizational context. When implemented in an organizational context, the system and methodology of the present invention may provide valuable risk assessment and warnings as well as predictions of possible events which may occur in corporate, governmental, business or other types of organizational settings. In a personal context, the present invention may provide value data regarding predicted personal behavior, events, activities as well as data regarding affinity or lack thereof between and among individuals as well as a great many other characteristics of inter-personal relationships.

Further features and aspects of the present invention will become apparent from the following detailed description of the exemplary embodiments in connection with reference to the attached figures.

DETAILED DESCRIPTION

Figure 1:
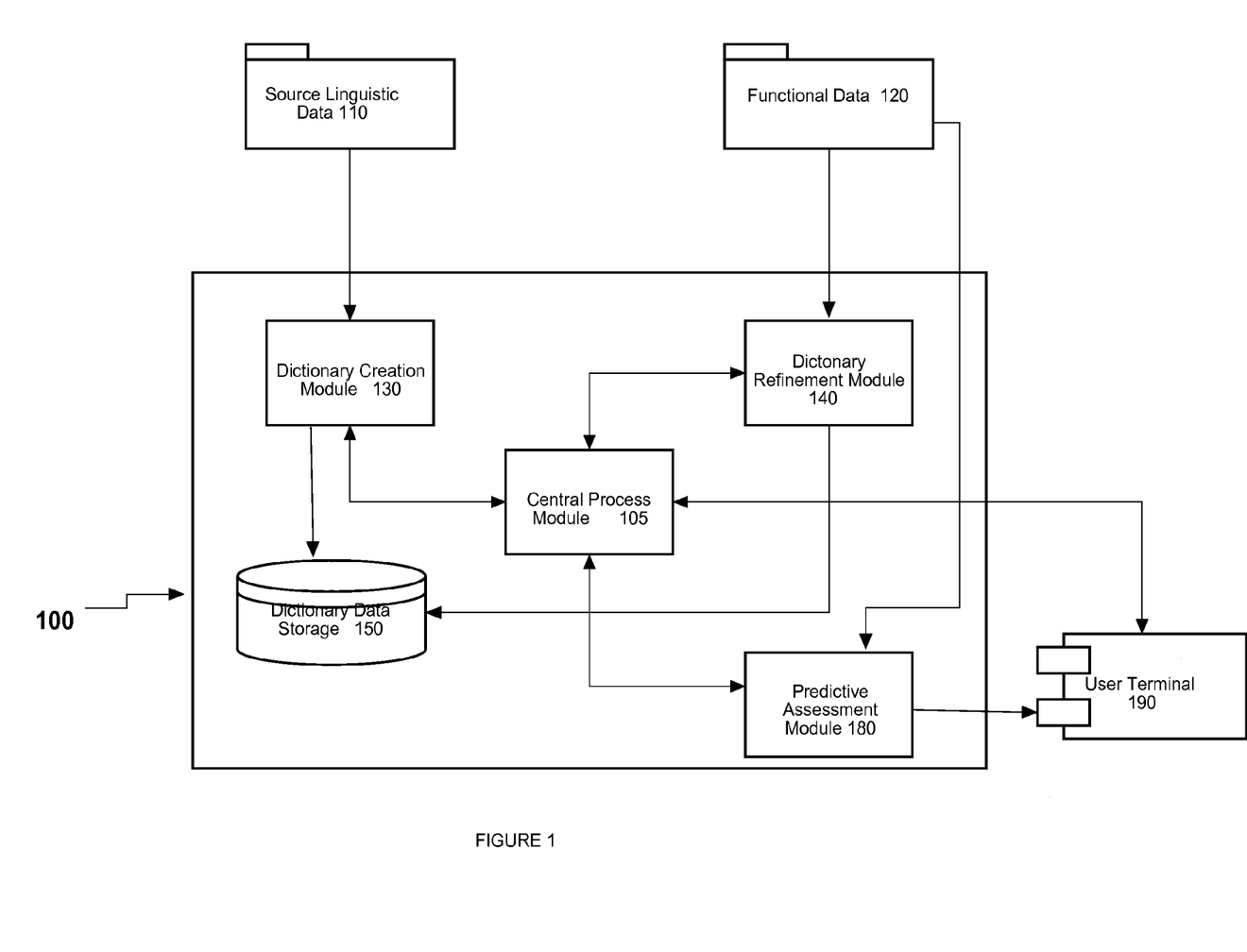
FIG. 1 is a diagram illustrating the system of the present invention and the major components thereof, according to a preferred embodiment thereof.

A description of the present invention in preferred embodiments thereof, now follows. With reference now to FIG. 1, the system of the present invention, in a preferred embodiment thereof, is now described. The system of the present invention includes a number of components that implement the functionality and methodologies of the present invention in a preferred embodiment. It will be understood by one of skill in the art that the system and methodologies of the present invention are described herein in the form of a number of preferred embodiments and that it is possible to deviate from these specific embodiments while still remaining within the scope and spirit of the present invention.

FIG. 1 illustrates the Predictive Analysis and Assessment System (PAAS) 100 and various components and processes associated therewith in a preferred embodiment of the present invention. PAAS 100 includes a number of modules that work collaboratively with the primary function of receiving source linguistic data 110 and functional data 120 and generating predictive output based thereupon. Preferably, all modules within PAAS 100 are under the direction and control of central process module 105. In a preferred embodiment, source linguistic data 110 is used to create a linguistic dictionary that is stored within dictionary data storage 150. Typically, PAAS 100 will store a number of dictionaries within dictionary data storage 150. Dictionary data storage 150 may be any known element or device for storing data, in this case, linguistic or textual data, such as a hard drive or some form of electronic storage capable of storing large amounts of data if required.

Multiple dictionaries may be stored within dictionary data storage 150. For example, there may exist dictionaries in different spoken languages (e.g. English, French, Russian, etc.), for different users (e.g. one for Company A, one for Company B, one for individual user A, one for individual user B, etc.), and/or dictionaries created for differing purposes (e.g. risk/safety assessment, culture assessment, predictive behavior modeling, etc.). In this case, and in one preferred embodiment of the present invention, multiple users may access PAAS 100 for different purposes and at different times. For purposes of simplicity, FIG. 1 shows only a single user terminal 190 interacting with PAAS 100. However, a great many terminals and devices may connect to PAAS 100 in parallel or at different times and by different users seeking the same or different analytic information via PAAS 100. It should be noted that when referring to "users" herein, such term may encompass one or more human users, a machine interface and/or a computing or other hardware system.

Also shown in FIG. 1 is dictionary creation module 130. Dictionary creation module 130 serves to receive source linguistic data 110 and process the same in order to generate an initial dictionary for a designed purpose as is more fully discussed below. Upon completion of dictionary creation by dictionary creation module 130, the dictionary is stored in dictionary data storage 150 as discussed above. Dictionary refinement module 140 receives functional data 120 from various sources as discussed more fully below and operates to refine dictionaries originally created by dictionary creation module 130. As will be explained below, the functional data 120 is obtained post-deployment after and while PAAS 100 has already been implemented to obtain functional data 120 over time and generate informational output. In this way, again, as more fully explained below, dictionaries can be improved and customized to provide better results not only based on original data used to create the dictionary in the first place but also using "live data" (functional data 120) in connection with the analytic function of PAAS 100.

Predictive assessment module 180 employs the aforementioned dictionaries, functional data 120 as received and one or more selected models to generate the predictive data which may be used for decision support and/or other purposes as discussed herein. In a preferred embodiment, the predictive data is formatted and transmitted to user terminal 190 for viewing and/or action by a user.

As noted above, control of PAAS 100 is managed by central process module 105. Various actions may be initiated by PAAS 100 itself and/or by a user via interaction with user terminal 190. These actions and commands are either generated internally within PAAS 100 based on an event or based on some scheduled activity or they are initiated via a command transmitted by user terminal 190 to central process module 105. Examples of these commands may include, without limitation, instantiation of a dictionary creation process, a read request for either or both of source linguistic data 110 and/or functional data 120, generation of one or more predictive assessments by predictive assessment module 180, the refinement of one or more dictionaries by dictionary refinement module 140, deletion of one or more dictionaries within dictionary data storage 150, selection of a one or more models for use by predictive assessment module in developing predictive data, as well as other commands and activities.

Figure 2:
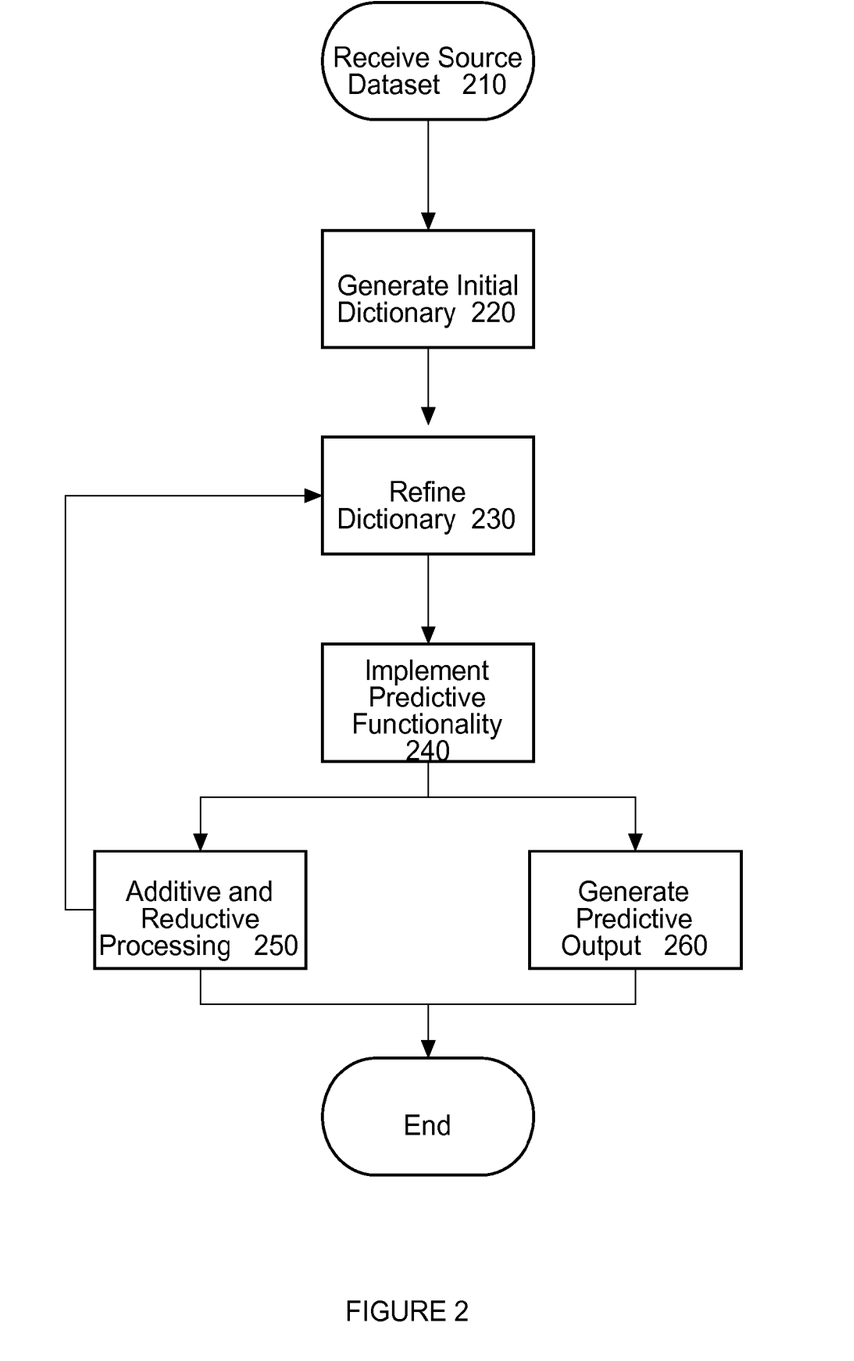
FIG. 2 is a flowchart illustrating the primary steps implemented according to the present invention, in a preferred embodiment thereof.

Turning now to FIG. 2, a process flow diagram is provided in connection with the following explanation of the major high level steps associated with the methodology of the present invention, in a preferred embodiment thereof. According to the method of the present invention, in a preferred embodiment, a source dataset is first received by the system at step 210. Upon receipt of this dataset, an initial dictionary is generated for a specific purpose as step 220. Next, the system refines the dictionary at step 230. In one case, this refinement may consist of formatting the data as well as undertaking initial processing upon the dictionary, such as removing "stop words" or other specific items from the dataset as more fully describe below. In another case, dictionary refinement may comprise recursive type modification of the dictionary based on the receipt and processing of functional data 120 as described more fully below.

Following the creation of a dictionary, predictive functionality may be implemented at step 240 using functional data 120 and one or more selected models. As discussed above, this is typically initiated via a command via user terminal 190 although it is also possible that predictive output generation may be initiated based on other events including, for example, at scheduled times under the control of central process module 105.

Steps 250 and 260 may occur in parallel. Step 260 involves the generation of predictive output based on the implementation of predictive functionality in the previous step. Step 250 involves dictionary refinement based on the two broad categories of additive and reductive processing as the same are discussed below. Thus, on the one hand, a user may be receiving predictive output at terminal 190 while at the same time the operative dictionary may be continually updated and modified based on the receipt by PAAS 100 of additional functional data 120.

Now that a general overview of the operation of PAAS 100 has been provided, the following description includes additional details regarding the specifics of various events, processes and activities as they occur within PAAS 100 in preferred embodiments thereof.

One key aspect of the present invention is the various methodologies through which dictionaries may be created. According to one embodiment of the present invention, dictionary creation may take place using questionnaires, interviews, focus groups or other formats designed to solicit free-flowing textual responses from designated recipients. In a preferred embodiment of the present invention, these queries are designed to solicit free-flowing responses which are based on various aspects of business and personal life. Of course, queries can be designed to solicit whatever information is deemed relevant to and indicative of the predictive output being sought. In addition to or instead of written responses, input may be received orally, possibly through an interview process or focus group, with the verbal responses being converted to electronic format. The textual responses are captured and stored electronically for further processing as part of step 220 (generate initial dictionary). In one preferred embodiment, particularly in cases where large sample sizes are used, questionnaires may be designed to be implemented through a web-based or browser based application.

After the initial sample of words are collected, the word selection process commences as part of step 220. In one embodiment, "stop words" are removed which means filtering out specific and pre-defined words from the sample. Preferably, these stop word lists which are maintained by PAAS 100 are comprised of words that are known or believed to be insignificant to the ultimate results. For example, a list of the most commonly used words in a spoken/written language can be removed. In English, for example, this list may include words such as "the, to, of, be . . . Etc.".

Additionally, other words, phrases and references may also be removed based on various characteristics. For example, words or phrases associated with specific recent events, situations or time periods can be removed. As such, if a specific event is top of mind for most people in the sample population (e.g. some macro event such as a stock market crash, start of a war etc. or something that happened in the industry such as a company announcing layoffs) but which is nonetheless deemed irrelevant or at least not viewed as correlating to the predictive model, then words or phrases associated with that event or situation may be removed from the dictionary.

Depending upon the specific characteristics of the subject pool including various idiosyncrasies and or unique but non-correlating characteristics, words contained in responses reflective of the same may also be removed as part of the initial dictionary building step (220). For example, when seeking predictive data on some matter at a national level, idioms associated with only those living in the south of the United States, may for example, be removed from the dictionary. Additionally, all common punctuation, numbers and symbols are preferably also removed from the dictionary in connection with the processing according to the teachings of the present invention.

The following represents an exemplary list of questions that may make up a questionnaire or interview used to solicit semi-free form input from a sample of users in connection with the construction of a dictionary as such is undertaken by dictionary creation module 130:

EXAMPLE QUESTIONS

A) What words do you associate with INTEGRITY? (20 words minimum)
B) List some qualities of a person who has INTEGRITY (10 words minimum)
C) Describe the state of mind of someone who has integrity? (10 words minimum)
D) Provide an example of someone demonstrating integrity? (50 words minimum)
E) What feelings do you associate with integrity? (10 words minimum)
F) What happens when you act with integrity? (30 words minimum)
G) Describe the qualities of a person who has integrity in the workplace? (10 words minimum)
H) Provide an example of someone demonstrating integrity in the workplace? (50 words minimum)
I) What happened when someone demonstrates integrity in the workplace? (30 words minimum)
J) How do people react to someone demonstrating integrity in the workplace? (30 words minimum)
K) Provide a list of qualities of a workplace that encourages integrity. (20 words minimum)
L) Describe the environment of a workplace where integrity is encouraged? (10 words minimum)

Once all of the above referenced processing has been completed, step 220 continues such that a term-by-document matrix is constructed resulting in a global index. For an example of such a matrix, the reader should refer to FIG. 3. As can be seen, the matrix includes, for each document (the document typically representing a set of responses by a single person), the number of occurrences of each word used. In one embodiment, the number of occurrences can be based on the aggregate set of responses by a single person (i.e. the complete questionnaire) while in another embodiment, number of occurrences can be tracked and noted on a response by response basis (e.g. the number of occurrences in each textual answer to each specific question).

Figure 3:
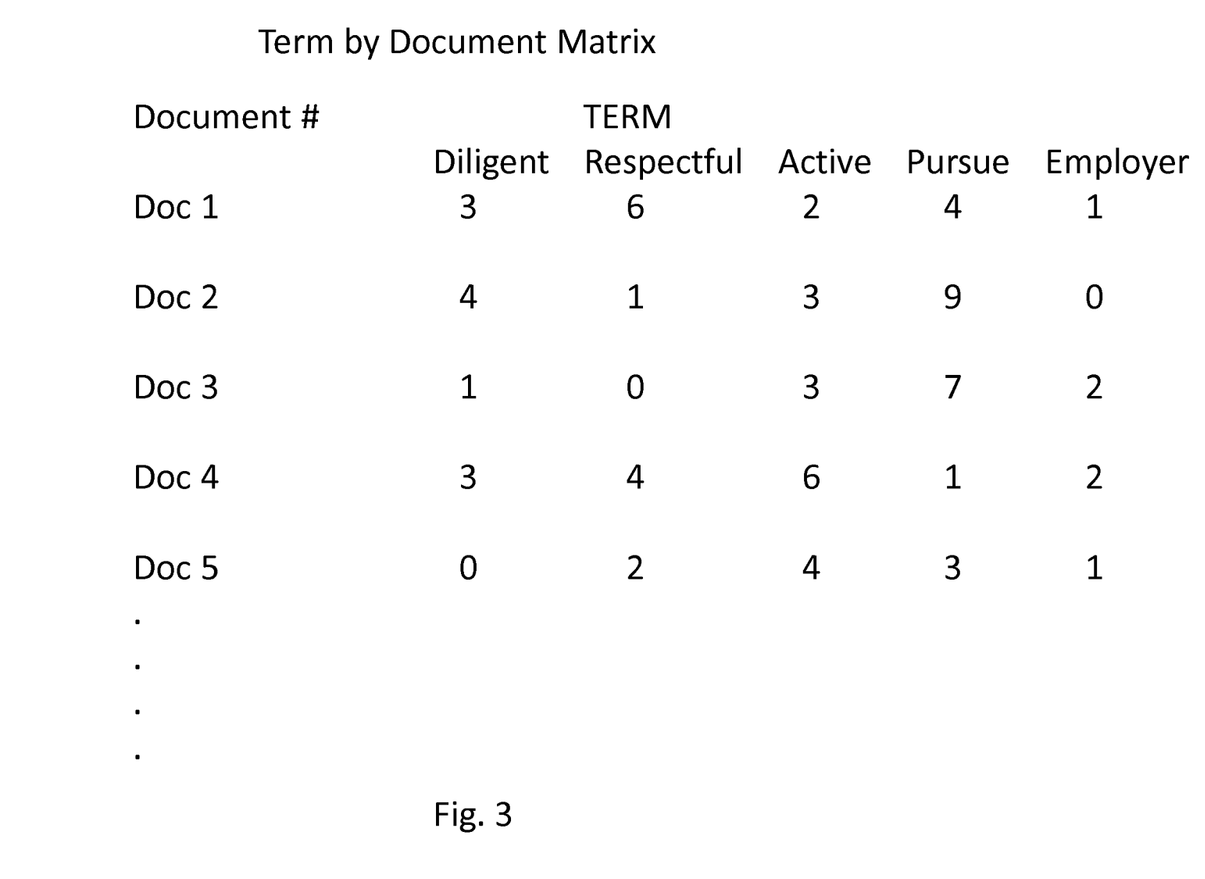
FIG. 3 is an example of a term-by-document matrix that may be constructed according to the teachings of the present invention in connection with dictionary generation.
Figure 4:
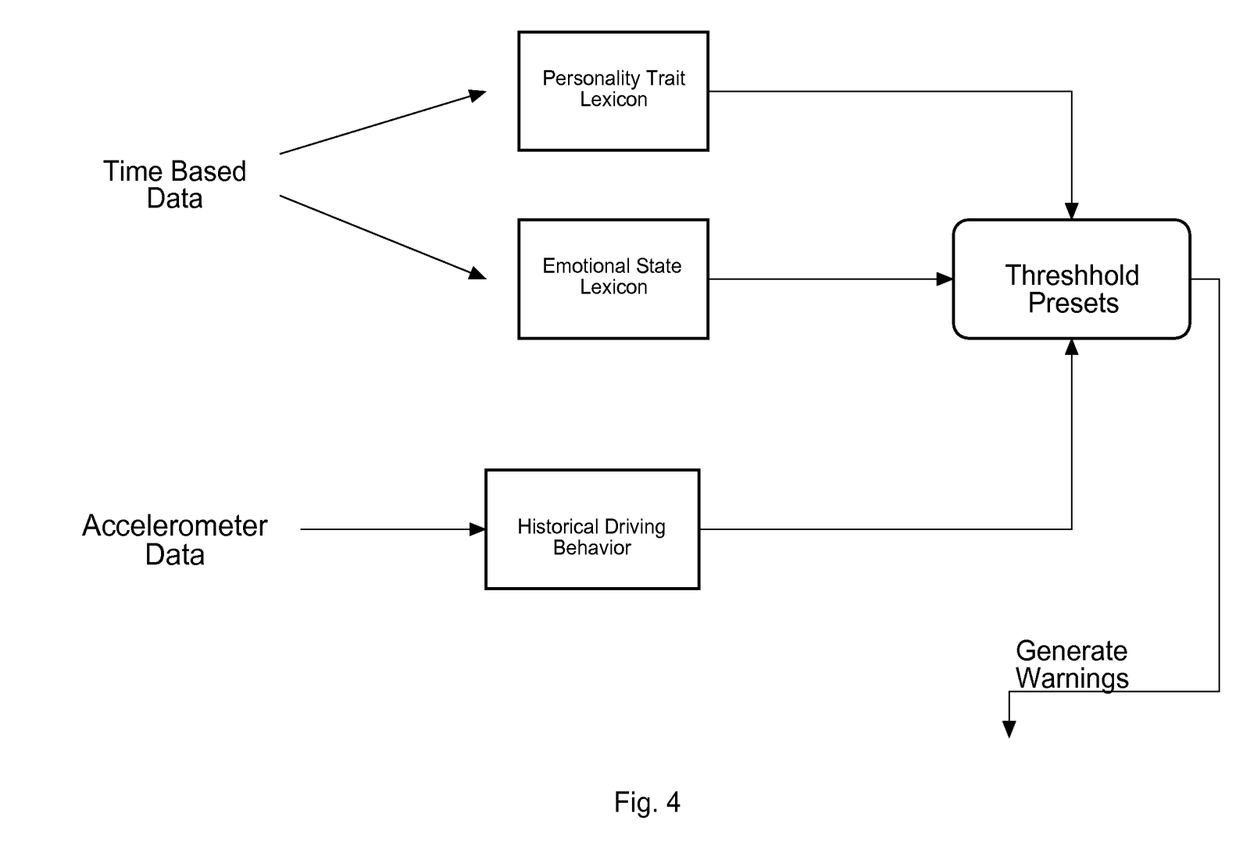
FIG. 4 is an example illustrating the application of the system of the present invention in connection with a set of personal communications and the resulting predictive capabilities based thereon in a preferred embodiment of the present invention.

In the example presented in FIG. 3, the first document (e.g. the set of written responses provided by one survey participant) demonstrates the use of the word "diligent" 3 times, the word "respectful" 6 times, the word "active" 2 times, the word "pursue" 4 times and the word "employer" one time. Once this input is received and this table is constructed for all documents various possibilities for further processing exist, in each case, with the goal of completing the dictionary for use according to the teachings of the present invention in mind.

In one preferred embodiment, all words that are used a minimum number of times in all documents may be included in a final dictionary. Similarly, a minimum usage for all documents with the exception of some number X of documents could instead be the requirement for inclusion in the dictionary. In other words, if there are 100 documents, a term may be included in the final dictionary only if, for example, at least 95 of those documents use that term at least one time (or at least 3 times, etc.). One of ordinary skill in the art will recognize the various permutations on qualifications required for inclusion in the final dictionary all of which fall within the scope and spirit of the present invention.

Dictionaries and queries for soliciting dictionary data may be designed, as is generally known in the art, for specific purposes and to reflect specific human characteristics as communicated through textual language such as integrity, affinity, happiness and other states of mind. Dictionaries may also be seeded with specific terms regardless of responses from queries if desired, such as, for example, locally relevant phrases or terminology. Also, additional words may be added or given increased relevance based on proximity to other words of importance.

Dictionary input may be obtained from many different sources. For example, some or all of source linguistic data 110 may come from a linguistic source such as a face to face interview, or collected entirely electronically using a sample of online survey respondents. Further, source data 110 may be obtained from a sample which is the same as the user base providing functional data 120 or from an independent source or from some combination thereof. Various dictionaries may be constructed and available for different purposes. For example, in one implementation, PAAS 100 may employ a single composite dictionary for motivational assessments and another single composite dictionary for each other type of assessment such as behavioral, functional, safety, etc.

In an alternative embodiment, PAAS 100 may maintain multiple dictionaries for each type of assessment based on various characteristics that will necessarily impact the content of the dictionaries. For example, PAAS 100 may employ multiple dictionaries designed for use in connection with motivational assessments such as by industry (one for each relevant industry), region, dialect, language, etc.

Once a dictionary is created it can be refined initially based on the above in connection with step 230 in FIG. 2. The dictionary is then available for use by PAAS 100 in connection with predictive functionality. This occurs at step 140. At this step, PAAS 100 may automatically generate periodic reports, warnings and/or other communications, preferably through user terminal 190 to users of PAAS 100. In addition or alternatively, PAAS 100 may generate reports, warnings and other communications based on specific requests initiated at user terminal 190. The predictive assessment functionality is managed by predictive assessment module 180.

In connection with this process, functional data 120 is received by predictive assessment module 180 and in connection with dictionary data available in dictionary data storage 150, warnings, reports and other communications are generated. These notifications may be based on either an aggregate set of functional data 120 (e.g. emails received by PAAS 100 over the past 1 hour, 1 day etc.) or on a "real time" basis. In the latter case, predictive assessment module 180 will monitor functional data 120 as it comes into PAAS 100 and provide notifications as required based upon active dictionaries and past functional data 120.

In a preferred embodiment of the present invention, each user of PAAS 100 receives a random ID and may also be associated with one or more characteristics. For example, a user may be assigned to a job category such as "manager", "sales group", "HR" etc. In this way, reporting may be done on a characteristic by characteristic basis. For example, reporting, as discussed in further detail below, may be limited only to functional data 120 sourced from specific categories of users such as managers, salespersons, legal, human resources, etc. In this way, PAAS 100 may monitor and report based only on data which is relevant to the event or predictive aspect being analyzed. As one example, in the context of monitoring for potential safety risks on an assembly line, PAAS 100 may limit monitoring only to functional data 120 such as emails generated by employees who work on or visit the specific assembly line.

In another embodiment, monitoring, as carried out by predictive assessment module 180 may assign specific weights to categories associated with functional data 120. For example, in the previous example, weighting of functional data 120 generated by those working on the assembly line may carry a very heavy weighting in the assessment process, while functional data 120 generated by those that work in customer service (and are not associated with the assembly line) may be considered but not carry the same weighting in safety risk assessment, for example or in reporting generally.

In one embodiment of the present invention, scoring in order to determine the level of relevance associated with a possible event is carried out as follows. The following equation may be used:

$$\text{Score} = \frac{\text{Total Number of Words Used in the Dictionary}}{\text{Total Number of Words Used in Functional Data}}$$

Other equations may also be used without departing from the scope or spirit of the present invention. In predicting the future employee happiness event, the predictive assessment module 180 may be looking for the trends across lexicons/dictionaries, and issue an assessment and likelihood of happiness based on the scores across other organizational level lexicons/dictionaries, such as harmony, teamwork, and motivation.

Predictive assessment module 180 may therefore function to process functional data 120 as received or as collated as against one or more dictionaries in order to make predictions and/or generate reports according to one or more models. There are two different scenarios under which models can be fit. At a broad level, these two scenarios can be defined as predicting linguistic outcomes and predicting non-linguistic outcomes. In the former case, an index of a given construct can be set as the outcome measure. This means that models will be used to explain and predict the construct in question. For example, it can be seen whether motivation, trust and/or cohesion may be used to predict engagement, for example, at a workplace. All four of the above referenced measures are themselves linguistic measures.

The second scenario involves non-linguistic outcome measures. Examples of this may include whether the use of positive teamwork related language, inquisitiveness and language of excellence over time may be used to demonstrate a strong relationship to reported medical errors (or the lack thereof) in the same discrete time periods. Another example is the issuing of an alert when the lexicons have exceeded a critical threshold. For example, lexicons that capture the three domains of organizational teamwork, employee motivation, and candid communication may all exceed critical thresholds that have previously shown to be predictive of a critical safety event occurring.

Any number of types of models can be employed in connection with this process. For example, non-parametric models may be particularly useful in this context. Examples of such models, which is in no way limiting to the type or variety of models which could be used, include Random Forest models, Neural Networks and Bayesian non-parametric models. It is believed that these models are likely to outperform their parametric counterparts because they require fewer assumptions regarding the statistical relationships between dependent and independent variables.

In another important aspect of the present invention, and as alluded to above, refinement of the dictionaries used may occur post-deployment or, in other words, on a recursive basis such that functional data 120 may be used to refine the dictionaries over time as PAAS 100 operates in predictive mode. In order to improve the accuracy of the dictionaries, two additional processes can be utilized. These processes are post-deployment processes. What is meant by this is that while the development of the dictionaries requires a semi-structured sample space, these refinement processes depend on ongoing statistical processes across an unstructured space. This unstructured space is most often the location of the deployment of PAAS 100 itself.

In this context, unstructured means that at any given time there is no reasonable expectation that the individual or group whose communication is being analyzed would be talking specifically about the topic contained in the index more or less than they would under normal conditions. These refinement processes can be divided into two groups—additive and reductive as now further described.

Once words or phrases have been added or removed from a dictionary, that dictionary no longer remains a global index but instead becomes a local index or dictionary. It may in certain cases be desirable to employ in the predictive phase both a global dictionary/index and a local dictionary/index. Typically, the global index will make benchmarking across clients easier, whereas the local index will improve predictive accuracy.

Additive Refinement

Additive refinement refers to identifying words and phrases to be incorporated into a local index to improve its accuracy for the local environment. In some cases this may mean that words and/or phrases specific to an organization or a region may improve the quality of the index. In other cases, it may mean that adding additional global words or phrases that did not appear in the original semi-structured analysis but which significantly improve performance at a local level should be added. Local level words and phrases may be incorporated into the global index if they are used consistently across multiple distinct local environments.

The process of additive refinement may function according to a co-location process which works as follows:
1) Identify and count the frequency of words within a pre-defined word distance of all of the words in the global index;
2) Remove stop-words from these lists of co-located words;
3) If a word co-occurs with words in the global index consistently, then it can be added to the global index.

Consistency as referenced above may be defined as a rate—for example, the number of co-occurrences per unit time. An effective cut-off rate for adjustment can be empirically determined, or defined by a priori knowledge.

In one embodiment of the present invention, when non-linguistic data is available, additional steps may be undertaken following the co-location process. After collocation, the localized dictionary may be used to re-analyze historical data and its predictive accuracy can then be compared to that of the global dictionary during the same time period and with the same non-linguistic outcome variables. If the accuracy improves (for example, as measured by a reduction in mean squared error after a holdout analysis) then that iteration of the local dictionary is accepted. If the accuracy doesn't improve then the process reverts to the previous version of the dictionary whether it is an older version of the local dictionary or the global dictionary itself.

By way of example, in a holdout analysis historical data may be divided into two chunks—one possibly containing 80% of the data the other 20% (other allocations are also possible). The larger set may then be used to train the predictive models. Then the data from the smaller set is fed into the models and the outcomes they predict are compared to what actually occurred (it is possible to know what actually occurred because it is historical data). Then the difference between actual and prediction may be squared and averaged across all the data points in the smaller historical data set giving a mean squared error.

Reductive Refinement

In a manner similar to that of additive refinement, reductive refinement seeks to identify the patterns of usage in natural language in relation to the global index and remove inconsistencies. In other words, each word or phrase's occurrence rate may be correlated with the overall index at each point in time. Words or phrases with an average correlation closest to zero with regard to the overall index may be removed from the index. Words or phrases that are, on average, negatively correlated with the overall index can be weighted appropriately.

Examples of Possible Applications in the Context of Organizational Culture
1) Tracking linguistic measures of organizational culture over time, relative to a baseline period (using dictionaries only).
2) Tracking linguistic measures of organizational culture over time, relative to a baseline period and benchmarking against industry peers (measured using dictionaries only).
3) Tracking linguistic measures of organizational culture over time (measured using dictionaries) and estimating the likelihood of critical events (e.g. safety incidents) using safety data to develop predictive models.

As will be recognized by one of ordinary skill in the art, the present invention also lends itself to a wide variety of other applications including analysis and predictive functionality in the context of personal communications. For example, PAAS 100 may be deployed locally at a client terminal and/or as a server based application to provide predictive output, reporting and guidance in communicating based on received communications and related dictionaries generated for this purpose.

In the case of personal analytics, an exemplary embodiment may be tied to the analysis and assessment of driving behavior. For instance, using different lexicons related to personality traits and emotional state, PAAS 100 may create a profile of an individual's personality characteristics and emotional condition over time. This may be paired with data of historical driving behavior as recorded by accelerometers. A critical threshold is then created for a psychological condition or specific emotional state, as it relates to specific driving behavior. PAAS 100 may then be configured to send a warning to the individual informing him/her of the driving risk if the designated threshold is exceeded or if some other trigger occurs.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A decision support and assessment system comprising:
   one or more processors configured to execute computer program modules, the computer program modules comprising:
   a dictionary creation module configured to obtain source linguistic data and create a dictionary based upon said source linguistic data, said source linguistic data comprising a plurality of terms linked to psychological concepts and wherein said source linguistic data is generated through a use of one or more of questionnaires, interviews or focus groups;
   a dictionary refinement module configured to obtain functional data and refine said dictionary based upon said functional data; and
   a predictive assessment module configured to employ said dictionary and said functional data and apply at least one model thereto in order to generate predictive data configured to provide decision support or assessment.

2. The decision support and assessment system of claim 1 further comprising a dictionary data storage component for storing said dictionary.

3. The decision support and assessment system of claim 1 wherein said predictive data is communicated to a user terminal for display.

4. The decision support and assessment system of claim 1 wherein said functional data is generated post-deployment after such time as said system has been implemented to generate said predictive data.

5. The decision support and assessment system of claim 1 wherein said source linguistic data is generated through a use of a web-based questionnaire.

6. The decision support and assessment system of claim 1 wherein said dictionary creation module is further configured to remove terms from said dictionary based upon an association of said terms with specific events or situations.

7. The decision support and assessment system of claim 1 wherein said dictionary refinement module is further configured to remove terms from said dictionary based upon the association of said terms with specific events or situations.

8. The decision support and assessment system of claim 1 wherein said dictionary is generated based upon a term-by-document matrix indicative of a number of occurrences for each term in at least one document and wherein said dictionary includes only terms with a minimum number of occurrences.

9. The decision support and assessment system of claim 1 wherein said predictive assessment module is configured to process said functional data against said dictionary by predicting one or more linguistic outcomes.

10. The decision support and assessment system of claim 1 wherein said predictive assessment module is configured to process said functional data against said dictionary by predicting one or more non-linguistic outcomes.

11. A computer-implemented method for providing decision support and assessment, the method being implemented in a computer system that includes one or more physical processors and storage media storing machine-readable instructions, the method comprising:
    obtaining a source linguistic dataset;
    generating an initial dictionary based upon said source linguistic dataset said source linguistic dataset comprising a plurality of terms linked to psychological concepts and wherein said source linguistic dataset is generated through a use of one or more of questionnaires, interviews or focus groups;
    employing functional data, said initial dictionary and at least one model to generate a predictive output configured to provide decision support or assessment; and
    refining said initial dictionary based upon a receipt of additional source linguistic data.

12. The method of claim 11 further comprising employing said functional data, said refined initial dictionary and said at least one model to generate additional predictive output.

13. The method of claim 11 wherein said refining said initial dictionary comprises additive processing.

14. The method of claim 11 wherein said refining said initial dictionary comprises reductive processing.

15. The method of claim 11 wherein said generating an initial dictionary further comprises removing stop words.

16. The method of claim 11 wherein said predictive output comprises predicting at least one linguistic outcome.

17. The method of claim 11 wherein said predictive output comprises predicting at least one non-linguistic outcome.

18. The method of claim 12 wherein said predictive output comprises predicting at least one linguistic outcome.

19. The method of claim 12 wherein said predictive output comprises predicting at least one non-linguistic outcome.

20. The method of claim 11 wherein said at least one model comprises a parametric model.

21. The method of claim 11 wherein said at least one model comprises a nonparametric model.

* * * * *